Patented Dec. 1, 1925.

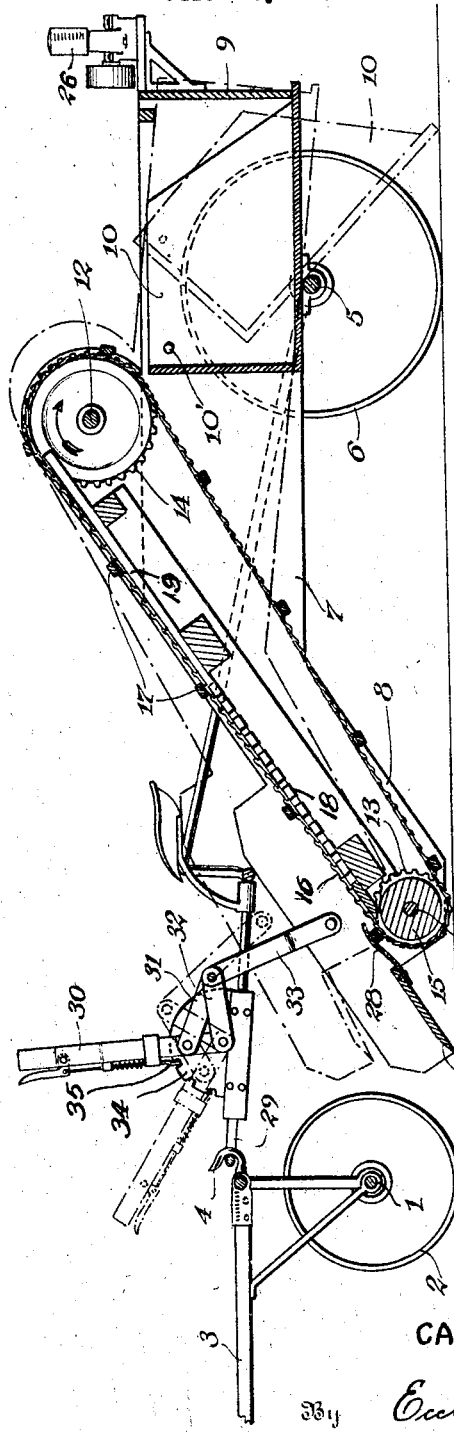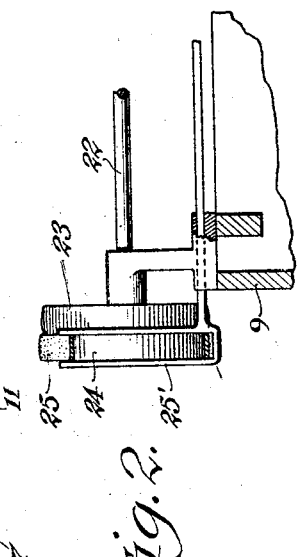

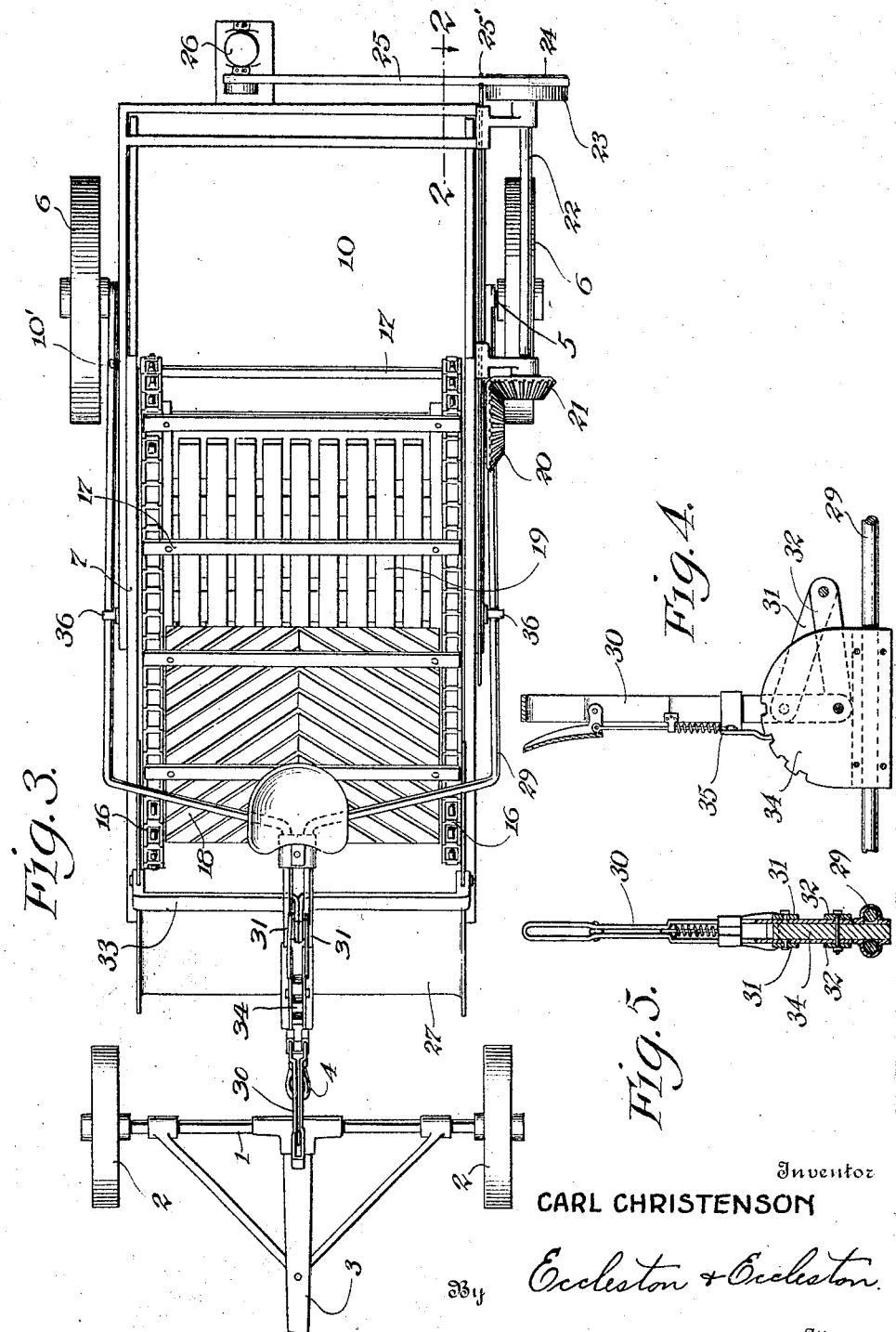

1,563,340

UNITED STATES PATENT OFFICE.

CARL CHRISTENSON, OF IOLA, WISCONSIN.

STONE PICKER.

Application filed May 16, 1923. Serial No. 639,413.

*To all whom it may concern:*

Be it known that I, CARL CHRISTENSON, a citizen of the United States, residing at Iola, in the county of Waupaca and State of Wisconsin, have invented certain new and useful Improvements in Stone Pickers, of which the following is a full, clear, and exact description.

My invention relates to a machine for removing stones, rocks and the like from roads or farm lands, and has for its object the provision of a simple and inexpensive device by which the stones may be gathered and carried to a dumping receptacle forming a part of the machine.

Another object of the invention resides in the provision of novel means by which the working parts of the stone picker may be raised to inoperative position.

A further object of the invention comprises a yoke connecting the front and rear axles of the machine and on which are mounted the driver's seat and the means by which the picker mechanism is raised and lowered.

Other objects and advantages of the invention will be apparent from the following description when taken in connection with the accompanying drawings, in which:

Figure 1 is a longitudinal section through the complete apparatus.

Figure 2 is a fragmentary transverse section taken on line 2—2 of Figure 3.

Figure 3 is a plan view of the device.

Figure 4 is an enlarged side elevation of the raising and lowering mechanism, and Figure 5 is a vertical section taken through the disclosure of Figure 4.

Referring to the drawing more in detail, the numeral 1 designates the front axle of the apparatus provided with the wheels 2 and singletree 3. A hook 4 is provided for receiving and supporting the main portion of the apparatus to be later described.

The rear axle of the picker is indicated by the numeral 5 and has mounted thereon the wheels 6. Also mounted on the rear axle 5 is the stone picking apparatus which includes the main frame 7 inclined downwardly, as indicated by numeral 8. The frame 7 is closed at its rear end by the member 9 and has pivoted adjacent thereto the dumping receptacle 10 which receives the stones removed from the ground. A rod 10' is provided for locking the receptacle 10 in non-dumping position.

Supported between the side walls of the frame 7 are the shafts 11 and 12 on which are fixed the sprocket wheels 13 and 14, respectively. A roller 15 is loosely mounted on the lower shaft between the sprocket wheels 13 for the purpose of aiding in regulating the depth to which the picker shall extend into the ground.

Endless chains 16 are operatively connected to the sprocket wheels 13 and 14 and have mounted thereon a plurality of transversely extending slats 17 which form a conveyor. A screen is positioned just below the upper path of the conveyor and comprises the screen 18 of herringbone design and the screen 19 formed of longitudinally extending parallel slats.

For the purpose of operating the conveyor the shaft 12 is provided with a bevel gear 20 which meshes with the bevel gear 21 carried by one end of shaft 22. The opposite end of shaft 22 carries the fixed and loose pulleys 23 and 24 which are operated by the belt 25 from the internal combustion engine or other source of power 26. A belt shifter 25' is slidably mounted at the side of the frame 7.

Projecting forwardly of the frame 7 is a scoop or blade 27 provided with a flexible apron 28 for guiding the stones, dirt and the like onto the conveyor and screen.

The front and rear axles are connected by a substantially Y-shaped yoke 29 which has its two arms connected to opposite ends of the axle 5 and its leg engaged by the hook 4. In order to raise and lower the picker proper or to adjust the depth at which it is to travel in the ground, I have provided a lever 30 pivoted on the yoke 29. The lever 30 has pivoted thereto the two vertically spaced links 31 and 32, which are also pivoted to the strap 33, which is in turn attached to the main frame of the picker. A toothed segment 34 co-operates with the hand-operated pawl 35 for holding the lever 30 in various adjusted positions; while lugs 36 are carried by the frame for engagement with the yoke 29 to limit the downward movement of the picker.

In operation the scoop or blade is adjusted to proper depth through the lever 30 and the conveyor put in motion by means of the motor 26. The apparatus is then drawn over the ground from which the rocks are to be removed. The dirt, stones, etc., are raised by the inclined scoop 27 and carried by the conveyor 17 over the screens 18 and 19, thereby permitting the finer materials to return to the ground, but carrying the stones to the rear, where they are deposited in the dumping receptacle 10.

From the foregoing description it will be seen that I have provided an extremely simple arrangement of elements whereby stones and the like will be automatically removed from the ground and deposited in a receptacle for removal.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claim.

What I claim as new and desire to secure by Letters Patent is:

A stone picker, including front and rear axles, a frame mounted on the rear axle, a vertically extending member closing the rear end of the frame, a receptacle pivotally mounted on the rear axle, said receptacle being open at its rear end and adapted to be closed by the vertically extending member when in horizontal position, a conveyor and screen carried by the frame, and means for operating the conveyor whereby stones may be carried to the receptacle.

CARL CHRISTENSON.